US010625706B2

(12) United States Patent
Fukumoto et al.

(10) Patent No.: US 10,625,706 B2
(45) Date of Patent: Apr. 21, 2020

(54) GAS GENERATOR

(71) Applicant: Daicel Corporation, Osaka-shi, Osaka (JP)

(72) Inventors: Kenji Fukumoto, Tatsuno (JP); Tomoharu Kobayashi, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 16/314,750

(22) PCT Filed: Jul. 3, 2017

(86) PCT No.: PCT/JP2017/024357
§ 371 (c)(1),
(2) Date: Jan. 2, 2019

(87) PCT Pub. No.: WO2018/016307
PCT Pub. Date: Jan. 25, 2018

(65) Prior Publication Data
US 2019/0152423 A1 May 23, 2019

(30) Foreign Application Priority Data
Jul. 20, 2016 (JP) .................................. 2016-142008

(51) Int. Cl.
*B60R 21/264* (2006.01)
*C06D 5/00* (2006.01)
*B60R 21/26* (2011.01)

(52) U.S. Cl.
CPC .............. *B60R 21/264* (2013.01); *C06D 5/00* (2013.01); *B60R 2021/26011* (2013.01)

(58) Field of Classification Search
CPC .......... B60R 21/264; B60R 2021/2642; B60R 2021/2648; B60R 21/268; B60R 2021/2685; B60R 2021/26011
(Continued)

(56) References Cited

U.S. PATENT DOCUMENTS 4,817,828 A * 4/1989 Goetz ................. B60R 21/2171
102/288
4,846,368 A * 7/1989 Goetz ................. B60R 21/2171
222/3
(Continued)

FOREIGN PATENT DOCUMENTS

JP 2007-302230 A 11/2007
JP 2011-157025 A 8/2011
JP 2016-107689 A 6/2016

*Primary Examiner* — Jonathan C Weber
(74) *Attorney, Agent, or Firm* — Birch, Stewart, Kolasch & Birch, LLP

(57) ABSTRACT

The present invention provides a gas generator, including: a cylindrical housing; an ignition device installed at a first end of the cylindrical housing, and a diffuser portion installed at a second end thereof; a flow channel forming member disposed inside the cylindrical housing and including a partition wall which separates a first chamber from a second chamber; a combustion chamber formed in the first chamber; a discharge passage formed in the second chamber; a first cylindrical space formed on the outside of the first circumferential wall and a first communication hole formed in the first circumferential wall; a second cylindrical space formed on the outside of the second circumferential wall and being in communication with the first cylindrical space, and a second communication hole formed in the second circumferential wall; a cylindrical filter disposed in the second cylindrical space; an outer diameter (d1) of the first circumferential wall, an outer diameter (d2) of the second circumferential wall and an outer diameter (d3) of the cylindrical filter satisfying relationships of d1>d2 and d1≥d3; and between the cylindrical filter and the inner wall surface of the cylindrical housing, the second cylindrical space facing the second communication hole via the cylindrical filter.

12 Claims, 5 Drawing Sheets

(58) Field of Classification Search
USPC ......... 102/530, 531; 280/741, 742, 736, 740
See application file for complete search history.

(56) References Cited

U.S. PATENT DOCUMENTS

| | | | | |
|---|---|---|---|---|
| 5,000,479 | A * | 3/1991 | Werner | B60R 21/261 |
| | | | | 280/736 |
| 5,368,329 | A * | 11/1994 | Hock | B60R 21/2644 |
| | | | | 102/202 |
| 7,438,316 | B2 * | 10/2008 | Patterson | B60R 21/2644 |
| | | | | 280/741 |
| 7,654,565 | B2 * | 2/2010 | McCormick | B60R 21/2644 |
| | | | | 280/736 |
| 8,302,992 | B2 * | 11/2012 | Hanano | B60R 21/262 |
| | | | | 102/531 |
| 8,376,400 | B2 | 2/2013 | Mason et al. | |
| 9,051,224 | B2 * | 6/2015 | Mason | B60R 21/2644 |
| 9,114,778 | B2 * | 8/2015 | Hanano | B60R 21/2644 |
| 10,046,727 | B2 | 8/2018 | Hanano et al. | |
| 2006/0273564 | A1 * | 12/2006 | McCormick | B60R 21/2644 |
| | | | | 280/740 |
| 2007/0248511 | A1 | 10/2007 | Mason et al. | |
| 2011/0187088 | A1 | 8/2011 | Hanano et al. | |
| 2017/0349136 | A1 * | 12/2017 | Hanano | B60R 21/261 |
| 2019/0126885 | A1 * | 5/2019 | Fukumoto | B01J 7/00 |
| 2019/0152424 | A1 * | 5/2019 | Fukumoto | B60R 21/262 |

\* cited by examiner

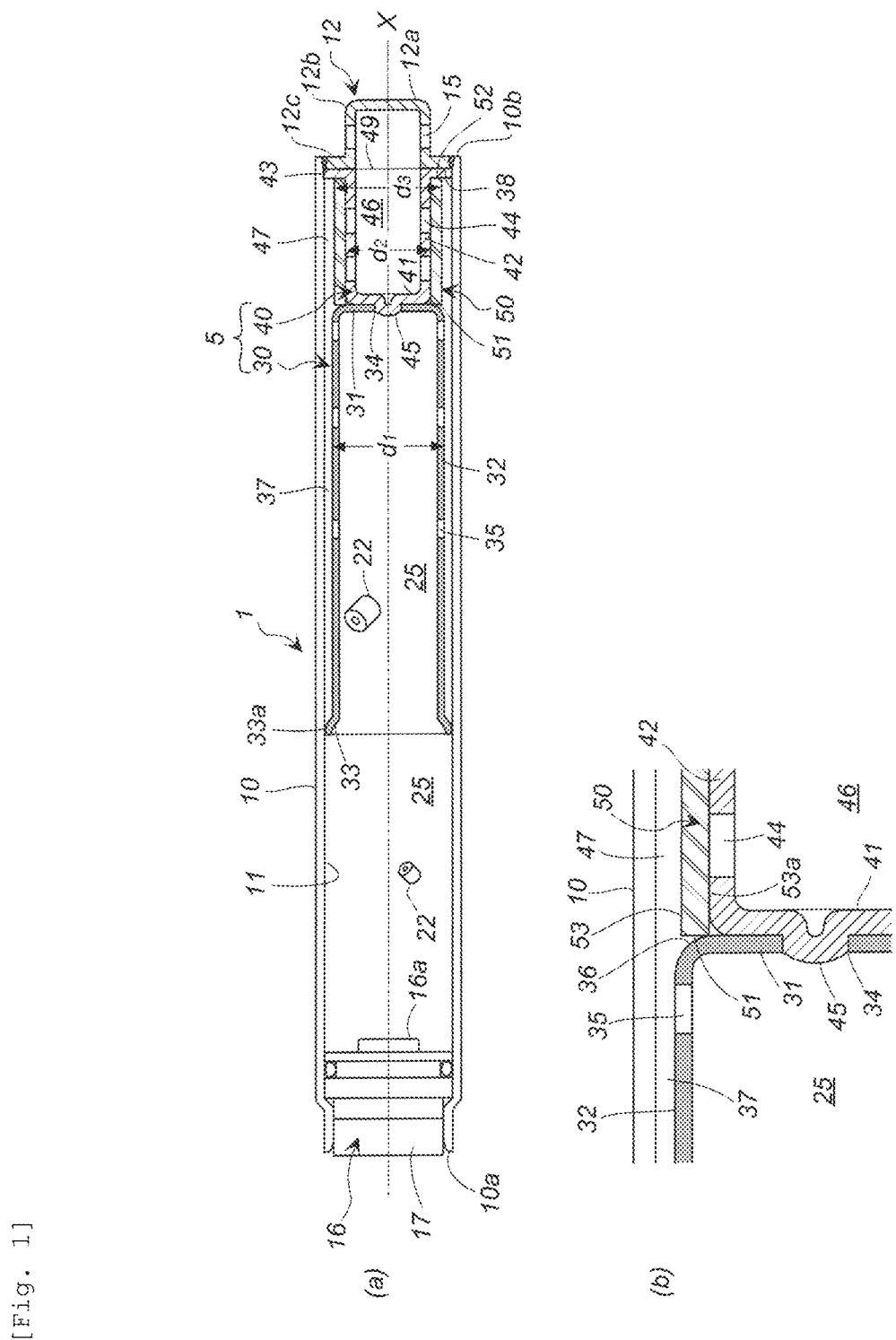
[Fig. 1]

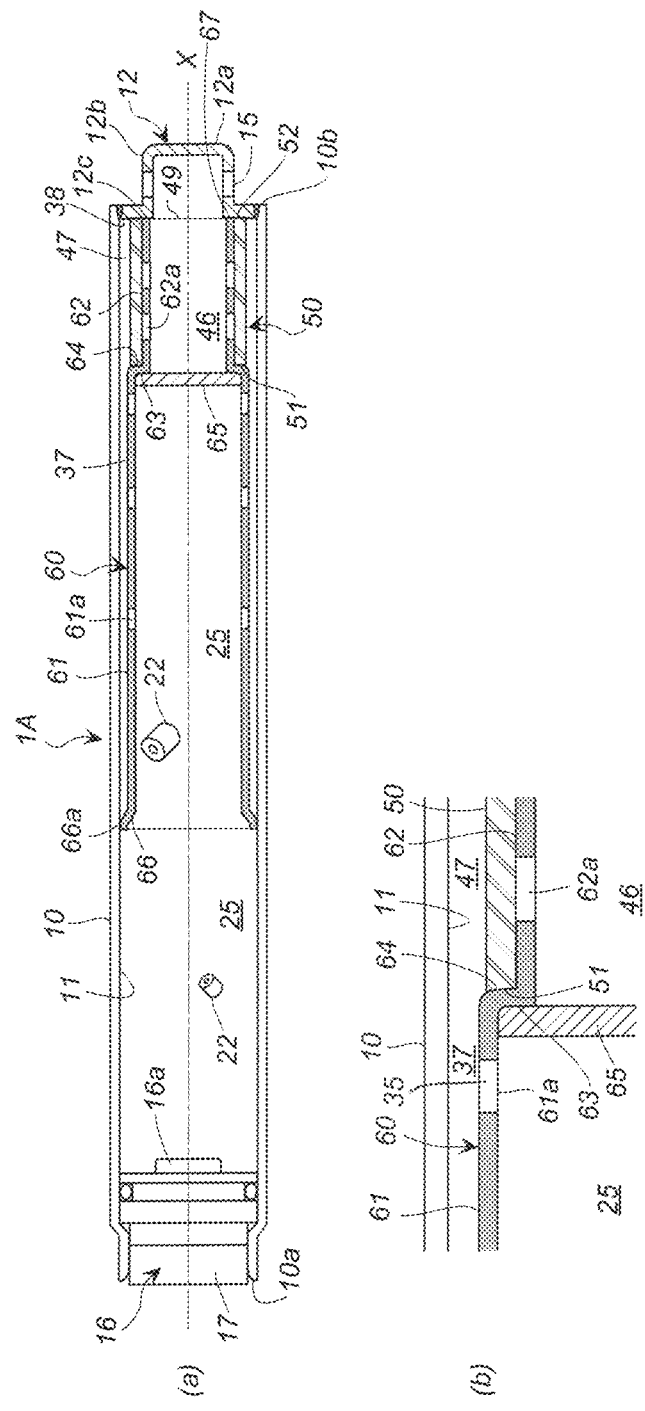
[Fig. 2]

[Fig. 3]
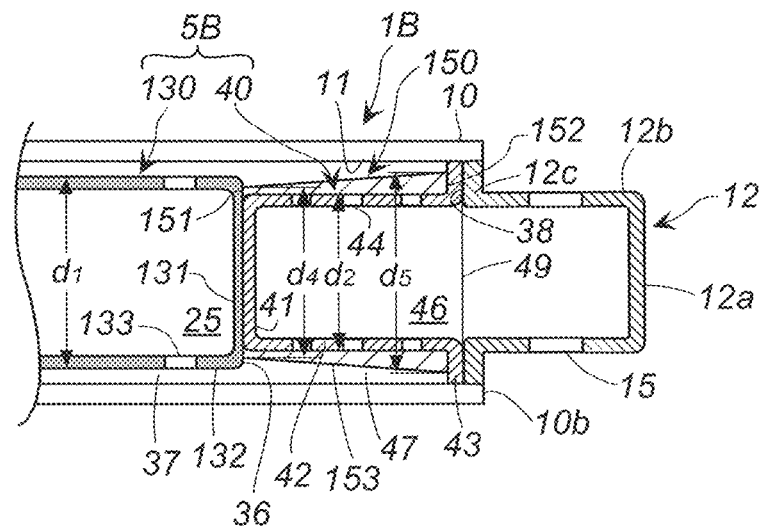
[Fig. 4]
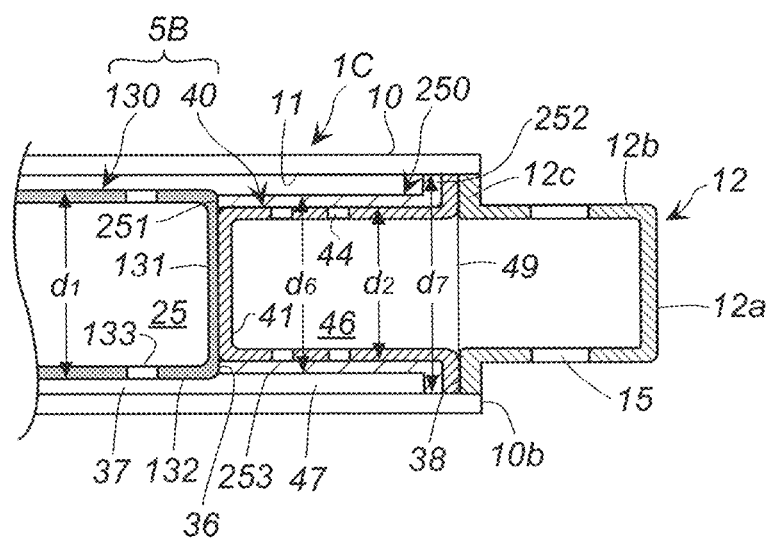

[Fig. 5]
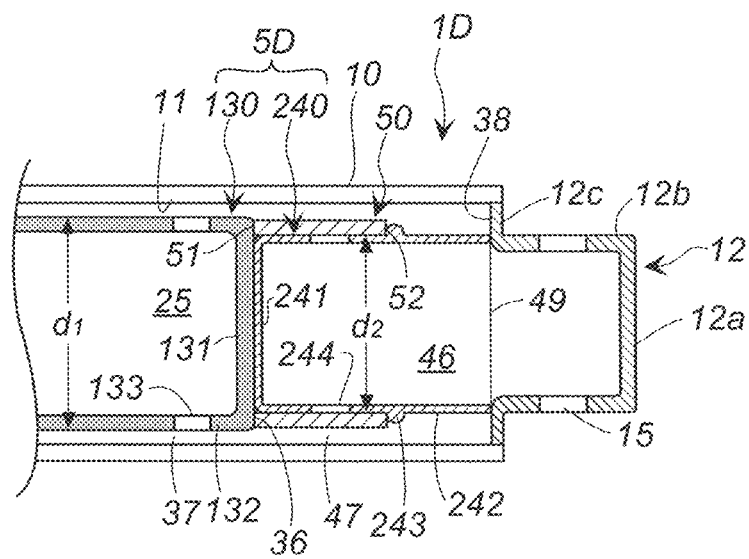
[Fig. 6]
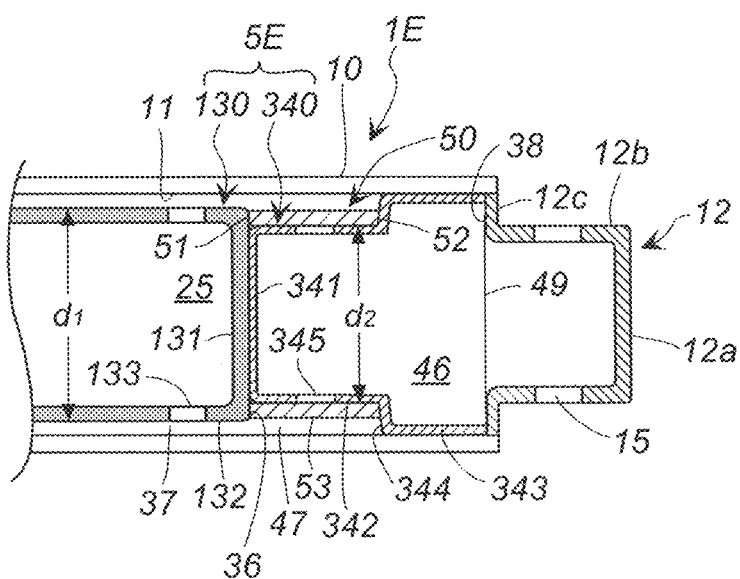

[Fig. 7]
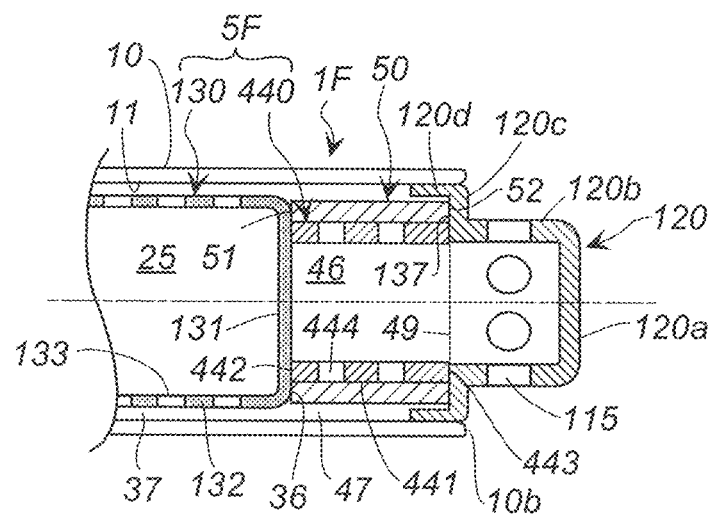
[Fig. 8]
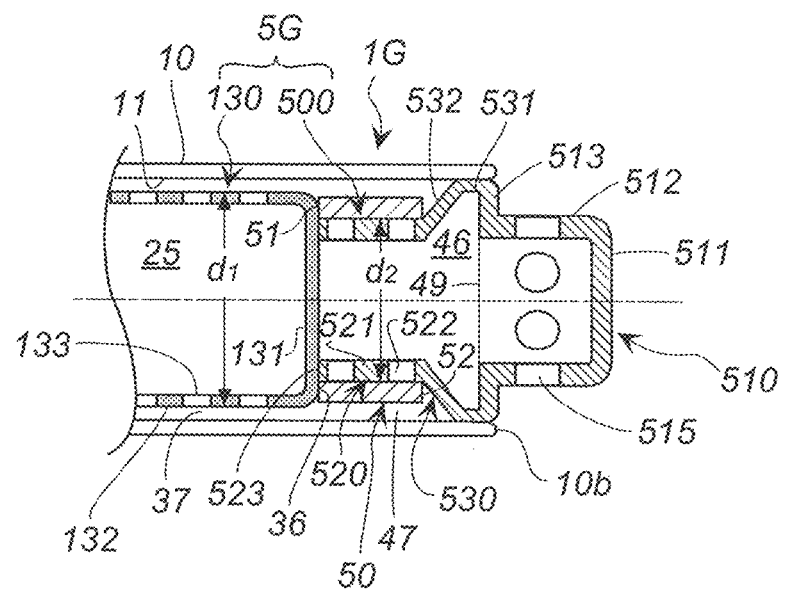

GAS GENERATOR

TECHNICAL FIELD

The present invention relates to a gas generator usable for an airbag apparatus mounted to an automobile.

DESCRIPTION OF RELATED ART

Known is a gas generator in which an igniter and a gas generating agent are accommodated in a cylindrical housing and a combustion gas flows from one end to the other end.

U.S. Pat. No. 8,376,400 B2 discloses a pyrotechnic gas generator using a gas generating agent, in which an initiator 20 is disposed at one end of a cylindrical housing and a gas exit aperture 13 is formed at an opposite end thereto. Inside the cylindrical housing, an inner housing 15 and a baffle 40 are combined to form a cavity 21 which allows a gas to flow inside a housing wall 26.

It is described in the second half of column 4 that the baffle 40 cools a combustion gas and removes particulates from the combustion gas. In the end of column 4, it is described that a filter may be disposed in a central baffle chamber 42 or along a gas flow path between an inner housing chamber 15d and the gas exit aperture 13.

SUMMARY OF INVENTION

A first aspect of the present invention provides a gas generator, including:

a cylindrical housing;

an ignition device installed at a first end of the cylindrical housing, and a diffuser portion provided with a gas discharge port and installed at a second end on an opposite side to the first end;

a cylindrical flow channel forming member disposed inside the cylindrical housing such that a first end thereof faces the ignition device and a second end thereof on an opposite side to the first end faces the diffuser portion, the cylindrical flow channel forming member including a partition wall which separates a first chamber defined by a first circumferential wall on the side of the first end, from a second chamber defined by a second circumferential wall on the side of the second end;

a combustion chamber formed in the first chamber and charged with a gas generating agent which generates a combustion gas;

a discharge passage formed in the second chamber and allowing the combustion gas to flow to the diffuser portion;

a first cylindrical space formed between the first circumferential wall and an inner wall surface of the cylindrical housing, and a first communication hole formed in the first circumferential wall and communicating the combustion chamber with the first cylindrical space;

a second cylindrical space formed between the second circumferential wall and the inner wall surface of the cylindrical housing and being in communication with the first cylindrical space in an axial direction, and a second communication hole formed in the second circumferential wall and communicating the second cylindrical space with the discharge passage; and a cylindrical filter disposed in the second cylindrical space and enclosing the second communication hole, an outer diameter (d1) of the first circumferential wall and an outer diameter (d2) of the second circumferential wall satisfying a relationship of d1>d2 so that an annular stepped surface is formed between the first circumferential wall and the second circumferential wall, and the outer diameter (d1) of the first circumferential wall and an outer diameter (d3) of the cylindrical filter satisfying d1≥d3, and between the cylindrical filter and the inner wall surface of the cylindrical housing, the second cylindrical space facing the second communication hole via the cylindrical filter.

A second aspect of the present invention provides a gas generator, including:

an ignition device installed on the side of a first end of a cylindrical housing, and a diffuser portion provided with a gas discharge port and installed on the side of a second end on an opposite side in an axial direction to the first end;

an annular end surface at the second end, which is in contact with an inner wall surface of the cylindrical housing, being formed between the second end of the cylindrical housing and the diffuser portion;

a cylindrical flow channel forming member disposed from the side of the first end toward the second end inside the cylindrical housing, an internal space of the cylindrical flow channel forming member being partitioned by a partition wall into a first chamber on the side of the first end and a second chamber on the side of the second end;

a space, which includes the first chamber inside the cylindrical flow channel forming member, being a combustion chamber charged with a gas generating agent and the second chamber inside the cylindrical flow channel forming member forming part of a gas discharge passage which allows a combustion gas generated by combustion of the gas generating agent to flow toward the diffuser portion;

the cylindrical flow channel forming member having a first circumferential wall facing the first chamber and a second circumferential wall facing the second chamber;

in the cylindrical flow channel forming member, an upstream end of the flow channel forming member on an upstream side of a flow of the combustion gas toward the gas discharge port during actuation being positioned on the side of the first end of the cylindrical housing, a downstream end of the flow channel forming member on a downstream side of the flow of the combustion gas being positioned on the side of the second end of the cylindrical housing, and the downstream end being abutted against the annular end surface;

a first cylindrical space being formed between the first circumferential wall and the inner wall surface of the cylindrical housing, a second cylindrical space being formed between the second circumferential wall and the inner wall surface of the cylindrical housing, and the first cylindrical space and the second cylindrical space being arranged so as to form a continuous space in the axial direction;

a plurality of first communication holes being formed in the first circumferential wall and a plurality of second communication holes being formed in the second circumferential wall;

a cylindrical filter which encloses the second communication holes being disposed in the second cylindrical space;

an outer diameter (d1) of the first circumferential wall on the side of the first chamber and an outer diameter (d2) of the second circumferential wall on the side of the second chamber satisfying a relationship of d1>d2, an annular stepped surface being formed between the first circumferential wall and the second circumferential wall;

a portion being provided in which the outer diameter (d1) of the first circumferential wall and an outer diameter (d3) of the cylindrical filter satisfy a relationship of d1≥d3; and between the cylindrical filter and the inner wall surface of the cylindrical housing opposing the cylindrical filter radially outward, the second cylindrical space which is continuous with the first cylindrical space being secured in a state where the second cylindrical space faces the second communication holes via the cylindrical filter.

BRIEF DESCRIPTION OF THE DRAWINGS

The present invention will become more fully understood from the detailed description given hereinbelow and the accompanying drawings which are given byway of illustration only, and thus are no limitative of the present invention and wherein:

FIG. 1 shows, in (a), a cross-sectional view in a direction of the axis X of a gas generator according to the present invention and, in (b), a partial cross-sectional view of (a);

FIG. 2 shows, in (a), a cross-sectional view in a direction of the axis X of a gas generator of another embodiment of the present invention and, in (b), a partial cross-sectional view of (a);

FIG. 3 shows a partial cross-sectional view in an axial direction of a gas generator of yet another embodiment of the present invention;

FIG. 4 shows a partial cross-sectional view in an axial direction of a gas generator of yet another embodiment of the present invention;

FIG. 5 shows a partial cross-sectional view in an axial direction of a gas generator of yet another embodiment of the present invention;

FIG. 6 shows a partial cross-sectional view in an axial direction of a gas generator of yet another embodiment of the present invention;

FIG. 7 shows a partial cross-sectional view in an axial direction of a gas generator of yet another embodiment of the present invention; and FIG. 8 shows a partial cross-sectional view in an axial direction of a gas generator of yet another embodiment of the present invention.

DETAILED DESCRIPTION OF INVENTION

The present invention provides a gas generator including an igniter and a gas generating agent accommodated inside a cylindrical housing, and a cylindrical filter disposed in a gas discharge passage leading to a gas discharge port from a combustion chamber accommodating the gas generating agent, the cylindrical filter being not buckled, that is, not compressed and deformed in an axial direction even when subjected to pressure of a combustion gas during actuation.

The cylindrical housing and a diffuser portion may be integrally molded in advance, or a cup-shaped diffuser portion may be integrated with the cylindrical housing by being welded to a second end of the cylindrical housing. Even when the cylindrical housing and the diffuser portion are integrally molded in advance, a boundary portion of the cylindrical housing with the diffuser portion corresponds to the second end.

An annular end surface at the second end, which is in contact with an inner wall surface of the cylindrical housing, is formed between an opening at the second end of the cylindrical housing and the diffuser portion. For example, the annular end surface at the second end is formed as follows:

(i) An aspect in which a cup-shaped diffuser portion having a flange at an opening is used and the flange of the diffuser portion is fitted into the opening of the second end of the cylindrical housing and then fixed by welding. In this aspect, the flange of the diffuser portion forms the annular end surface;

(ii) An aspect in which a cylindrical housing having a flange extending inward at an opening of a second end is used and an opening of a cup-shaped diffuser portion is welded and fixed to the flange. In this aspect, the inwardly extending flange forms the annular end surface; and (iii) An aspect in which an annular protrusion protruding inward or a combination of a plurality of independent protrusions formed at regular intervals in a circumferential direction and protruding inward is formed at a second end (a boundary portion between the cylindrical housing and the diffuser portion) of a cylindrical housing. In this aspect, the annular protrusion or the plurality of independent protrusions form the annular end surface.

In the cylindrical housing, a first end is on the side of an ignition device and the second end is on the side of the diffuser portion. The ignition device may include only an igniter or a combination of an igniter and a transfer charge or a combination of an igniter and a gas generating agent serving as a transfer charge. Furthermore, an ignition chamber may be defined on the side of the first end of the cylindrical housing by a retainer provided with a through hole.

In a cylindrical flow channel forming member disposed inside the cylindrical housing, a first end or an upstream end thereof is on the side of the first end of the cylindrical housing, a second end or a downstream end is on the side of the second end of the cylindrical housing, and an internal space is partitioned by a partition wall into two chambers, namely, a first chamber on the side of the first end and a second chamber on the side of the second end. "Upstream" and "downstream" indicate directions in which a combustion gas flows during actuation. A space including the first chamber is a combustion chamber charged with a gas generating agent. The second chamber forms part of a gas discharge passage which allows the combustion gas, generated by combustion of the gas generating agent, to flow toward the diffuser portion.

In the cylindrical flow channel forming member, the upstream end is positioned on the side of the first end of the cylindrical housing, the downstream end is positioned on the side of the second end of the cylindrical housing, and the downstream end is abutted against the annular end surface in the aspect (i), the aspect (ii), or the aspect (iii) described above. A first cylindrical space is formed between a first wall surface of the first chamber and the inner wall surface of the cylindrical housing. A second cylindrical space is formed between a second wall surface of the second chamber and the inner wall surface of the cylindrical housing. The first cylindrical space and the second cylindrical space are arranged so as to form a space continuous in the axial direction and, in a stage prior to the cylindrical filter being disposed, a width of the second cylindrical space is larger than a width of the first cylindrical space.

The cylindrical flow channel forming member internally partitioned into the first chamber and the second chamber by the partition wall is formed by the following aspects:

(I) An aspect of a combination of a cylindrical member and a cup member in which a downstream end of the cylindrical member has a surface provided with one or two or more holes or recesses, a bottom surface of the cup member has one or two or more protrusions corresponding to the holes or recesses of the cylindrical member, and the holes or recesses are fitted to the protrusions. In this aspect, the cylindrical flow channel forming member is formed by the combination of the cylindrical member and the cup member, the bottom surface of the cup member forms the partition wall, the first chamber is on the side of the cylindrical member, and the second chamber is on the side of the cup member;

(II) An aspect of a combination of a cylindrical member and a cup member in which a downstream end of the cylindrical member has a surface provided with a protrusion, a bottom surface of the cup member has a hole or a recess to be fitted to the protrusion of the cylindrical member, and the hole or the recess and the protrusion are fitted together. In this aspect, the cylindrical flow channel forming member is formed by the combination of the cylindrical member and the cup member, the bottom surface of the cup member forms the partition wall, the first chamber is on the side of the cylindrical member, and the second chamber is on the side of the cup member;

(III) An aspect of a combination of a cylindrical member and a cup member in which an opening of a downstream end of the cylindrical member is fitted into an annular groove formed in a bottom surface of the cup member, or abutted against the bottom surface of the cup member. In this aspect, the cylindrical flow channel forming member is formed by the combination of the cylindrical member and the cup member, the bottom surface of the cup member forms the partition wall, the first chamber is on the side of the cylindrical member, and the second chamber is on the side of the cup member;

(IV) An aspect of a combination of a cylindrical member and a cup member in which an opening of a downstream end of the cylindrical member is fitted into an annular groove formed in a bottom surface of the cup member, or abutted against the bottom surface of the cup member. In this aspect, the cylindrical flow channel forming member is formed by the combination of the cylindrical member and the cup member, and the bottom surface of the cup member forms the partition wall, but contrary to the above aspect (III), the first chamber is on the side of the cup member, and the second chamber is on the side of the cylindrical member;

(V) An aspect of a combination of a longer cylindrical member having a closed one end (downstream end) and a shorter tubular member in which an opening at one end of the shorter tubular member is abutted against the closed surface of the longer cylindrical member. In this aspect, the cylindrical flow channel forming member is formed by the combination of the longer cylindrical member and the shorter tubular member, the closed end surface of the longer cylindrical member forms the partition wall, the first chamber is on the side of the longer cylindrical member, and the second chamber is on the side of the shorter tubular member;

(VI) An aspect of a combination of a longer cylindrical member having a closed one end (downstream end) and a cup member in which a bottom surface of the cup member is abutted against the closed surface of the longer cylindrical member. In this aspect, the cylindrical flow channel forming member is formed by the combination of the longer cylindrical member and the cup member, the closed end surface of the longer cylindrical member and the bottom surface of the cup member form the partition wall, the first chamber is on the side of the longer cylindrical member, and the second chamber is on the side of;

(VII) An aspect in which an inside of a single tubular member is partitioned by a partition wall that is a separate member to form the first chamber and the second chamber. In this case, for example, the partition wall is press-fitted, or welded from outside if necessary, after a position thereof is determined in advance with a positioning protrusion (a positioning stepped surface formed by increasing or decreasing an inner diameter and an outer diameter of the tubular member) formed inside the tubular member.

The upstream end of the cylindrical flow channel forming member may be formed by an aspect in which a flange formed at an opening is abutted against and supported by the inner wall surface of the housing, or an aspect in which an enlarged diameter portion is formed and an outer circumferential surface of the enlarged diameter portion is abutted against and supported by the inner wall surface of the housing.

A cylindrical filter is disposed in the second cylindrical space to enclose a second communication hole of the second circumferential wall of the second chamber. In the cylindrical filter, both an inner diameter and an outer diameter thereof are uniform diameters, or the inner diameter is uniform but the outer diameter is partially increased or continuously increased.

An outer diameter ($d1$) of the first circumferential wall of the first chamber and an outer diameter ($d2$) of the second circumferential wall of the second chamber satisfy a relationship of $d1>d2$ and, due to the relationship of $d1>d2$ being satisfied, an annular stepped surface is formed between the first circumferential wall and the second circumferential wall. The outer diameter ($d1$) of the first circumferential wall of the first chamber and an outer diameter ($d3$) of the cylindrical filter have a portion which satisfies a relationship of $d1 \geq d3$. The cylindrical filter may have a portion satisfying a relationship of $d1<d3$. Even when the cylindrical filter has a portion satisfying a relationship of $d1<d3$, the second cylindrical space which is continuous with the first cylindrical space is secured between the cylindrical filter and the inner wall surface of the cylindrical housing opposing the cylindrical filter radially outward, in a state where the second cylindrical space faces the second communication hole. Thereby, a combustion gas discharge passage from the combustion chamber to the gas discharge port is secured.

During actuation, a combustion gas generated in the combustion chamber enters the first cylindrical space from first communication holes, moves and passes through the first cylindrical space and the second cylindrical space (a gap between the cylindrical filter and the cylindrical housing), enters the diffuser portion through the second communication hole after passing through the cylindrical filter, and is discharged from the gas discharge port. Since a discharge passage of the combustion gas is secured in this manner and excessive pressure is not applied to the cylindrical filter in an axial direction (a flow direction of the combustion gas), buckling of the cylindrical filter does not occur. Here, "buckling" means that the cylindrical filter is crushed in the axial direction (compressed toward the second end of the cylindrical housing).

It is preferable in the gas generator according to the present invention that the cylindrical filter has uniform inner and outer diameters, and the outer diameter ($d1$) of the first circumferential wall and the outer diameter ($d3$) of the cylindrical filter satisfy a relationship of $d1 \geq d3$, and between the cylindrical filter and the inner wall surface of the cylindrical housing opposing the cylindrical filter radially outward, the second cylindrical space which is continuous with the first cylindrical space is secured in a state where the second cylindrical space faces the second communication hole via the cylindrical filter.

The cylindrical filter in the above preferable aspect of the gas generator is disposed between the annular stepped surface, between the first circumferential wall and the second circumferential wall, and the annular end surface on the side of the second end of the cylindrical housing. Since the relationship of $d1 \geq d3$ is satisfied in the above preferable aspect of the gas generator, a discharge passage of combustion gas including the first cylindrical space and the second cylindrical space (a gap between the cylindrical filter and the cylindrical housing) is secured.

It is preferable in the gas generator according to the present invention that the cylindrical filter has a first end surface on the side of the first end of the cylindrical housing and a second end surface on the side of the second end of the cylindrical housing. It is preferable in the gas generator according to the present invention that the cylindrical filter has a uniform inner diameter, and the second end surface of the cylindrical filter on the side of the second end of the cylindrical housing has a largest outer diameter, the outer diameter (d1) of the first circumferential wall, an outer diameter (d4) of the first end surface of the cylindrical filter on the side of the first end of the cylindrical housing, and an outer diameter (d5) of the second end surface of the cylindrical filter satisfy a relationship of $d5 > d1 \geq d4$, and between the cylindrical filter and the inner wall surface of the cylindrical housing opposing the cylindrical filter radially outward, the second cylindrical space which is continuous with the first cylindrical space is secured in a state where the second cylindrical space faces the second communication hole via the cylindrical filter.

The cylindrical filter in the above preferable aspect of the gas generator is disposed between the annular stepped surface, between the first circumferential wall and the second circumferential wall, and the annular end surface on the side of the second end of the cylindrical housing. Since a relationship of $d5 > d1 \geq d4$ is satisfied in the above preferable aspect of the gas generator, a discharge passage of combustion gas including the first cylindrical space and the second cylindrical space (a gap between the cylindrical filter and the cylindrical housing) is secured. An outer circumferential surface of the second end surface of the cylindrical filter may be abutted against the inner wall surface of the cylindrical housing (the outer diameter d5 of the second end surface=the inner diameter of the cylindrical housing) or the outer circumferential surface of the second end surface may not be abutted against the inner wall surface of the cylindrical housing (the outer diameter d5 of the second end surface<the inner diameter of the cylindrical housing).

It is preferable in the gas generator according to the present invention that the cylindrical filter has a first end surface on the side of the first end of the cylindrical housing, a second end surface on an opposite side in an axial direction to the first end surface and a flange at the second end surface, and an inner diameter from the first end surface to the second end surface is uniform, the outer diameter (d1) of the first circumferential wall, an outer diameter (d6) of the cylindrical filter on a side of the first end surface, and an outer diameter (d7) of the flange on a side of the second end surface satisfy a relationship of $d7 > d1 \geq d6$, and between the cylindrical filter and the inner wall surface of the cylindrical housing opposing the cylindrical filter radially outward, the second cylindrical space which is continuous with the first cylindrical space is secured in a state where the second cylindrical space faces the second communication hole via the cylindrical filter.

The cylindrical filter in the above preferable aspect of the gas generator is disposed between the annular stepped surface, between the first circumferential wall and the second circumferential wall, and the annular end surface on the side of the second end of the cylindrical housing. Since a relationship of $d7 > d1 \geq d6$ is satisfied in the above preferable aspect of the gas generator, a discharge passage of combustion gas including the first cylindrical space and the second cylindrical space (a gap between the cylindrical filter and the cylindrical housing) is secured. The flange at the second end surface may be abutted against the inner wall surface of the cylindrical housing (the outer diameter d7 of the flange=the inner diameter of the cylindrical housing) or the flange may not be abutted against the inner wall surface of the cylindrical housing (the outer diameter d7 of the flange<the inner diameter of the cylindrical housing).

It is preferable in the gas generator according to the present invention that the second circumferential wall of the cylindrical flow channel forming member has a protrusion, which protrudes radially outward, on an outer circumferential surface, and the cylindrical filter is disposed to enclose the second communication hole between the protrusion and the annular stepped surface.

During actuation, a combustion gas moves and passes through the first cylindrical space and the second cylindrical space (a gap between the cylindrical filter and the cylindrical housing), passes the cylindrical filter to be filtered and cooled, and thereafter enters the diffuser portion through the second communication hole to be discharged from the gas discharge port. As described above, the cylindrical filter exhibits filtering and cooling functions because the cylindrical filter encloses the second communication holes of the second circumferential wall. Therefore, no functional problems arise even when the cylindrical filter does not enclose a portion of the second circumferential wall where the second communication hole is not provided. In the above preferable aspect of the gas generator, the protrusion is formed to decrease an area for arranging the filter, so that weight reduction is realized by reducing a length of the cylindrical filter while maintaining the filtering and cooling functions of the cylindrical filter. The protrusion may be an annular protrusion or may be a plurality of independent protrusions formed at regular intervals in the circumferential direction.

It is preferable in the gas generator according to the present invention that the second circumferential wall of the second chamber of the cylindrical flow channel forming member has an enlarged diameter portion which expands radially outward, and the cylindrical filter is disposed to enclose the second communication hole between the enlarged diameter portion and the annular stepped surface.

During actuation, a combustion gas moves and passes through the first cylindrical space and the second cylindrical space (a gap between the cylindrical filter and the cylindrical housing), passes the cylindrical filter to be filtered and cooled, and thereafter enters the diffuser portion through the second communication hole to be discharged from the gas discharge port. As described above, the cylindrical filter exhibits filtering and cooling functions because the cylindrical filter encloses the second communication holes of the second circumferential wall. Therefore, no functional problems arise even when the cylindrical filter does not surround a portion of the second circumferential wall where the second communication hole is not provided. In the above preferable aspect of the gas generator, the enlarged diameter portion is formed to decrease an area for arranging the filter, so that weight reduction is realized by reducing a length of the cylindrical filter while maintaining the filtering and cooling functions of the cylindrical filter.

In the gas generator according to the present invention, since the cylindrical filter disposed in the gas discharge passage leading to the gas discharge port from the combustion chamber accommodating a gas generating agent is prevented from receiving pressure in the axial direction during actuation, buckling of the cylindrical filter in the axial direction under pressure of the combustion gas does not occur.

The gas generator according to the present invention is usable as a gas generator for an airbag apparatus mounted to various types of automobiles.

EMBODIMENTS OF INVENTION (1) Gas Generator Shown in (a) and (b) in FIG. 1

In a gas generator 1, an igniter 16 which serves as an ignition device is installed at a first end 10*a* of a cylindrical housing 10. The igniter 16 is a known electric igniter fixed to a collar 17 and an ignition portion 16*a* thereof containing an ignition agent protrudes from the collar 17.

A diffuser portion 12 is attached at a second end 10*b* which is the opposite end to the first end 10*a* of the cylindrical housing 10. The diffuser portion 12 is generally in a cup shape having a bottom 12*a*, a circumferential wall 12*b* and a flange 12*c*, and is welded and fixed to the cylindrical housing 10 at the flange 12*c*. The diffuser portion 12 and the cylindrical housing 10 can be integrally formed.

A plurality of gas discharge ports 15 are formed in the circumferential wall 12*b*. The flange 12*c* of the diffuser portion 12 forms an annular end surface 38 which is in contact with an inner wall surface 11 at the second end 10*b* of the cylindrical housing 10.

In the present embodiment, a cylindrical flow channel forming member 5 includes a combination of a cylindrical member 30 and a cup member 40. A bottom surface 41 of the cup member 40 is a partition wall, an internal space on the side of the cylindrical member 30 forms a first chamber (a combustion chamber 25), and an internal space on the side of the cup member 40 forms a second chamber (a combustion gas inflow chamber 46).

In the cylindrical member 30, a downstream end (on the side of the second end 10*b* of the cylindrical housing) is closed and an upstream end (on the side of the first end 10*a* of the cylindrical housing) is open. The cylindrical member 30 has a closed surface 31 and a circumferential wall (a first circumferential wall) 32, and an enlarged diameter portion 33 formed in a flange shape is provided at the opening (at the upstream end). The closed surface 31 has a central hole 34, and the circumferential wall (the first circumferential wall) 32 has a plurality of first communication holes 35 which are gas passage holes. The plurality of first communication holes 35 are formed at equal intervals in both an axial direction and a circumferential direction of the cylindrical member 30. The cylindrical member 30 is press-fitted into the inner wall surface 11 of the cylindrical housing 10 at an outer circumferential edge 33*a* of the enlarged diameter portion 33. An outer diameter (d1) of the cylindrical member 30 (an outer diameter of the first circumferential wall 32) is smaller than an inner diameter of the cylindrical housing 10, and a first cylindrical space 37 with a uniform width is formed between the cylindrical member 30 and the cylindrical housing 10.

A space surrounded by the cylindrical housing 10, the igniter 16 and the cylindrical member 30 is a combustion chamber (the first chamber) 25. In the combustion chamber 25, a gas generating agent 22 is charged to be in contact with the ignition portion 16*a* of the igniter 16. As the gas generating agent 22, a same gas generating agent as those used in known gas generators can be used. A retainer having a gas passage hole may be disposed in the combustion chamber 25 so as to adjust a capacity of the combustion chamber 25 in accordance with an amount of the gas generating agent 22. The retainer may also be used when using a combination of the igniter 16 and a transfer charge.

The cup member 40 is disposed inside the cylindrical housing 10, at an end on the side of the diffuser portion 12 (on the side of the second end 10*b*). The cup member 40 has the bottom surface (the partition wall) 41 and a circumferential wall (a second circumferential wall) 42, and a flange 43 is provided at an opening. The circumferential wall (the second circumferential wall) 42 has a plurality of second communication holes 44, and a central portion of the bottom surface 41 has a protrusion 45 formed to protrude toward the igniter 16.

While the cup member 40 is press-fitted to and abutted against both the flange 12*c* (the annular end surface 38) of the diffuser portion 12 and the inner wall surface 11 of the cylindrical housing by adjusting an outer diameter of the flange 43 and the inner diameter of the cylindrical housing 10. The cup member 40 may be welded together with the flange 12*c* of the diffuser portion and the cylindrical housing 10. The opening of the cup member 40 is closed with a seal tape 49 to block moisture entering from the gas discharge ports 15. The combustion gas inflow chamber (the second chamber) 46 which is an internal space of the cup member 40 forms part of a gas discharge passage introducing a combustion gas generated by combustion of the gas generating agent to the diffuser portion 12.

The protrusion 45 of the cup member 40 is fitted into the central hole 34 of the cylindrical member 30. Since the enlarged diameter portion 33 of the cylindrical member 30 is press-fitted to the inner wall surface of the cylindrical housing 10 and the central hole 34 of the cylindrical member 30 is fitted to the protrusion 45 of the cup member 40, the cylindrical member 30 is fixed in both the axis X direction and a radial direction and disposed coaxially (on the axis X) with the cylindrical housing 10. The cylindrical member 30 is also pressed in the axis X direction by the gas generating agent 22 charged in the combustion chamber 25. Since the flange 43 of the cup member 40 is press-fitted into the cylindrical housing 10 and the cup member 40 is pressed in the axis X direction by the cylindrical member 30, the cup member 40 is fixed in both the axis X direction and a radial direction and disposed coaxially (on the axis X) with the cylindrical housing 10.

An outer diameter (d2) of the cup member 40 (an outer diameter of the second circumferential wall 42) is smaller than the inner diameter of the cylindrical housing 10. Thereby, a second cylindrical space 47 is present between the second circumferential wall 42 and the inner wall surface 11 of the cylindrical housing 10. The second cylindrical space 47 is a cylindrical space extending from a boundary with the first cylindrical space 37 to the annular end surface 38 (the flange 43), and forms a space that is continuous with the first cylindrical space 37 in the axis X direction.

The outer diameter (d2) of the cup member 40 (the outer diameter of the second circumferential wall 42) is smaller than the outer diameter (d1) of the cylindrical member 30 (the outer diameter of the first circumferential wall 32) (d1>d2). Thereby, an annular stepped surface 36 is formed between the first circumferential wall 32 and the second circumferential wall 42.

A cylindrical filter 50 is disposed in the second cylindrical space 47 to enclose the second communication holes 44 of the second circumferential wall 42. In the cylindrical filter 50, an inner diameter and an outer diameter are uniform, a first end surface 51 is abutted against the annular stepped surface 36, a second end surface 52 is abutted against the flange 43 of the cup member, and an inner circumferential surface 53a of a circumferential wall 53 is abutted against an outer circumferential surface of the second circumferential wall 42.

The outer diameter (d1) of the first circumferential wall 32 of the cylindrical member 30 and an outer diameter (d3) of the cylindrical filter 50 fitted to the cup member 40 satisfy a relationship of d1≥d3. Further, a width w1 of the annular stepped surface 36 and a thickness w2 of the cylindrical filter 50 satisfy a relationship of w1≥w2. Thereby, the second cylindrical space 47 is secured between the cylindrical filter 50 and the inner wall surface 11 of the cylindrical housing 10 facing the cylindrical filter 50 radially outward, in a state where the second cylindrical space 47 faces the second communication holes 44 via the cylindrical filter 50.

Next, an operation of the gas generator 1 shown in FIG. 1 will be described.

By actuation of the igniter 16, the gas generating agent 22 inside the combustion chamber 25 is burned to generate a combustion gas. The combustion gas flows out from the first communication holes 35 into the first cylindrical space 37, collides with the inner wall surface 11 of the cylindrical housing 10 and changes its direction to flow toward the diffuser portion 12. Once the combustion gas moves from the first cylindrical space 37 to the second cylindrical space 47, since the combustion gas runs into a dead end at the annular end surface 38 (the flange 43), the combustion gas passes through the circumferential wall 53 of the cylindrical filter 50, enters the combustion gas inflow chamber 46 from the second communication holes 44, and ruptures the seal tape 49. Thereafter, the combustion gas further changes its direction by colliding with the bottom 12a of the diffuser portion 12 and is discharged from the gas discharge ports 15.

In the gas generator 1 shown in FIG. 1, due to dimensions of each relevant member being adjusted in advance, the second cylindrical space 47 is secured in a state of being communicated with the first cylindrical space 37 even after the cylindrical filter 50 is disposed. Thereby, pressure of the combustion gas is applied to the circumferential wall 53 of the cylindrical filter 50 in a vertical direction but the pressure is not applied to the first end surface 51 in the axial direction, so that buckling of the cylindrical filter 50 does not occur.

(2) Gas Generator Shown in (a) and (b) in FIG. 2

A gas generator 1A shown in FIG. 2 is the same as the gas generator 1 shown in FIG. 1 with the exception of using a partition wall which is separate from a cylindrical flow channel forming member, as described in the aspect (VII) above, while, in the gas generator 1 shown in FIG. 1, the cylindrical flow channel forming member 5 includes a combination of the cylindrical member 30 and the cup member 40 and the bottom surface 41 of the cup member 40 is used as the partition wall (as described in the aspect (I) above). Hereinafter, a description focusing on portions that differ from those in the gas generator 1 shown in FIG. 1 will be given.

In a cylindrical flow channel forming member 60, a circumferential wall (a first circumferential wall) 61 on the side of the first end 10a of the cylindrical housing 10 is a larger diameter portion with a larger outer diameter, and a circumferential wall (a second circumferential wall) 62 on the side of the second end 10b of the cylindrical housing 10 is a smaller diameter portion with an outer diameter smaller than the outer diameter of the first circumferential wall 61. The cylindrical flow channel forming member 60 has a uniform thickness.

The cylindrical flow channel forming member 60 has an enlarged diameter portion 66 formed in a flange shape at an upstream end on the side of the first end 10a, and an outer circumferential edge 66a of the enlarged diameter portion 66 is press-fitted into the inner wall surface 11 of the cylindrical housing 10. In the cylindrical flow channel forming member 60, a downstream end 67 on the side of the second end 10b is abutted against the annular end surface 38.

A plurality of first communication holes 61a are formed in the first circumferential wall 61 and a plurality of second communication holes 62a are formed in the second circumferential wall 62. The first cylindrical space 37 is formed between the first circumferential wall 61 and the inner wall surface 11 of the cylindrical housing 10, and the second cylindrical space 47 is formed between the second circumferential wall 62 and the inner wall surface 11 of the cylindrical housing 10. The plurality of first communication holes 61a face the first cylindrical space 37 and the plurality of second communication holes 62a face the second cylindrical space 47.

Due to a difference in outer diameters and a difference in inner diameters between the first circumferential wall (the larger diameter portion) 61 and the second circumferential wall (the smaller diameter portion) 62, the cylindrical flow channel forming member 60 has an inner annular stepped surface 63 and an outer annular stepped surface 64. Inside the cylindrical flow channel forming member 60, a disk-shaped partition wall 65 is disposed in a state of being press-fitted to the first circumferential wall 61 and the inner annular stepped surface 63, so that the combustion chamber (the first chamber) 25 is defined on the side of the first end 10a of the cylindrical housing and the combustion gas inflow chamber (the second chamber) 46 is defined on the side of the second end 10b of the cylindrical housing.

The cylindrical filter 50 is fitted to the second circumferential wall 62 from outside such that the first end surface 51 thereof is abutted against the outer annular stepped surface 64 and the second end surface 52 thereof is abutted against the annular end surface 38. The plurality of second communication holes 62a are enclosed from outside by the cylindrical filter 50. The second cylindrical space 47 is secured between the cylindrical filter 50 and the inner wall surface 11 of the cylindrical housing.

Next, an operation of the gas generator 1A shown in FIG. 2 will be described.

By actuation of the igniter 16, the gas generating agent 22 inside the combustion chamber 25 is burned to generate a combustion gas. The combustion gas flows out from the first communication holes 61a into the first cylindrical space 37, collides with the inner wall surface 11 of the cylindrical housing 10 and changes its direction to flow toward the diffuser portion 12.

Once the combustion gas moves from the first cylindrical space 37 to the second cylindrical space 47, since the combustion gas runs into a dead end at the annular end surface 38, the combustion gas passes through the circumferential wall 53 of the cylindrical filter 50, enters the combustion gas inflow chamber 46 from the second communication holes 62a, and ruptures the seal tape 49. Thereafter, the combustion gas further changes its direction by colliding with the bottom 12a of the diffuser portion 12 and is discharged from the gas discharge ports 15.

In the gas generator 1A shown in FIG. 2, due to dimensions of each relevant member being adjusted in advance, the second cylindrical space 47 is secured in a state of being communicated with the first cylindrical space 37 even after the cylindrical filter 50 is disposed. Thereby, pressure of the combustion gas is applied to the circumferential wall 53 of the cylindrical filter 50 in a vertical direction but the pressure is not applied to the first end surface 51 in the axial direction, so that buckling of the cylindrical filter 50 does not occur.

(3) Gas Generator 1B Shown in FIG. 3

A gas generator 1B shown in FIG. 3 is the same as the gas generator 1 shown in FIG. 1 with the exception of using a cylindrical flow channel forming member in the aspect (VI) above and using a cylindrical filter different from that in the gas generator 1 shown in FIG. 1, while, in the gas generator 1 shown in FIG. 1, the cylindrical flow channel forming member 5 includes a combination of the cylindrical member 30 and the cup member 40 and the bottom surface 41 of the cup member 40 is the partition wall (as described in the aspect (I) above). Note that a cup member 40 is the same as that in the gas generator 1 shown in FIG. 1 with the exception of the protrusion 45.

A cylindrical flow channel forming member 5B includes a cylindrical member 130 and the cup member 40. The cylindrical member 130 has a closed surface 131 on the side of the second end 10b of the cylindrical housing, and an axially opposite end thereto on the side of the first end 10a is formed the same as that of the cylindrical member 30. The cylindrical member 130 has a plurality of first communication holes 133 in a circumferential wall (a first circumferential wall) 132. A first cylindrical space 37 is formed between the circumferential wall (the first circumferential wall) 132 of the cylindrical member 130 and the inner wall surface 11 of the cylindrical housing.

The cylindrical member 130 and the cup member 40 are disposed such that the closed surface 131 of the cylindrical member 130 and the bottom surface 41 of the cup member 40 abut against each other, and a combination of the closed surface 131 and the bottom surface 41 form a partition wall which separates the combustion chamber (the first chamber) 25 from the combustion gas inflow chamber (the second chamber) 46. Since an outer diameter (d1) of the cylindrical member 130 (an outer diameter of the first circumferential wall 132) and the outer diameter (d2) of the cup member 40 (the outer diameter of the second circumferential wall 42) satisfy a relationship of d1>d2, the annular stepped surface 36 is formed in a boundary portion thereof.

In a cylindrical filter 150, an inner diameter is uniform, an outer diameter of a first end surface 151 on the side of the first end 10a of the cylindrical housing is smallest, an outer diameter of a second end surface 152 on the opposite side in the axial direction to the first end surface 151 is largest, and the outer diameter of the cylindrical filter 150 continuously increases from the first end surface 151 to the second end surface 152. The cylindrical filter 150 is disposed such that the first end surface 151 is abutted against the annular stepped surface 36 and the second end surface 152 is abutted against the flange 43 of the cup member. There is a gap between the second end surface 152 of the cylindrical filter and the inner wall surface 11 of the cylindrical housing, but the second end surface 152 of the cylindrical filter may be abutted against the inner wall surface 11 of the cylindrical housing.

The outer diameter (d1) of the first circumferential wall 132 on the side of the combustion chamber (the first chamber) 25, an outer diameter (d4) of the first end surface 151, and an outer diameter (d5) of the second end surface 152 satisfy a relationship of d5>d1≥d4. Thereby, the second cylindrical space 47 is secured between the cylindrical filter 150 and the inner wall surface 11 of the cylindrical housing opposing the cylindrical filter 150 radially outward, in a state where the second cylindrical space 47 faces the second communication holes 44 via the cylindrical filter 150.

In the gas generator 1B shown in FIG. 3, due to dimensions of each relevant member being adjusted in advance, the second cylindrical space 47 is secured in a state of being communicated with the first cylindrical space 37 even after the cylindrical filter 150 is disposed. Thereby, pressure of the combustion gas is applied to the circumferential wall 153 of the cylindrical filter 150 in a vertical direction but the pressure is not applied to the first end surface 151 in the axial direction, so that buckling of the cylindrical filter 150 does not occur.

(4) Gas Generator 1C Shown in FIG. 4

The gas generator 1C shown in FIG. 4 only differs from the gas generator 1B shown in FIG. 3 in a shape of a cylindrical filter.

A cylindrical filter 250 has a uniform inner diameter, and has a first end surface 251 on the side of the first end 10a of the cylindrical housing and a flange 252 on the side of the second end 10b of the cylindrical housing. The cylindrical filter 250 is disposed such that the first end surface 251 is abutted against the annular stepped surface 36 and the flange 252 is abutted against the flange 43 of the cup member. The flange 252 of the cylindrical filter is also abutted against the inner wall surface 11 of the cylindrical housing.

The outer diameter (d1) of the first circumferential wall 132 on the side of the combustion chamber (the first chamber) 25, an outer diameter (d6) of a circumferential wall 253 on the side of the first end surface 251 of the cylindrical filter, and an outer diameter (d7) of the flange 252 on the side of the second end surface of the cylindrical filter satisfy a relationship of d7>d1≥d6. Therefore, the second cylindrical space 47 is secured between the cylindrical filter 250 and the inner wall surface 11 of the cylindrical housing opposing the cylindrical filter 250 radially outward, in a state where the second cylindrical space 47 faces the second communication holes 44 via the cylindrical filter 250.

In the gas generator 1C shown in FIG. 4, due to dimensions of each relevant member being adjusted in advance, the second cylindrical space 47 is secured in a state of being communicated with the first cylindrical space 37 even after the cylindrical filter 250 is disposed. Thereby, pressure of a combustion gas is applied to the circumferential wall 253 of the cylindrical filter 250 in a vertical direction but the pressure is not applied to the first end surface 251 of the cylindrical filter 250 in the axial direction, so that buckling of the cylindrical filter 150 does not occur.

(5) Gas Generator 1D Shown in FIG. 5

The gas generator 1D shown in FIG. 5 only differs from the gas generator 1B shown in FIG. 3 in shapes of a cup member and a cylindrical filter.

A cylindrical flow channel forming member 5D includes the cylindrical member 130 and a cup member 240. The cup member 240 has a bottom surface 241 and a circumferential wall (a second circumferential wall) 242, and an annular protrusion 243 that protrudes radially outward is formed on the circumferential wall (the second circumferential wall) 242. A plurality of second communication holes 244 are formed between the bottom surface 241 and the annular protrusion 243 in the circumferential wall 242.

The cylindrical member 130 and the cup member 240 are disposed such that the closed surface 131 of the cylindrical member 130 and the bottom surface 241 of the cup member 240 are abutted against each other, and a combination of the closed surface 131 and the bottom surface 241 form a partition wall which separates the combustion chamber (the first chamber) 25 from the combustion gas inflow chamber (the second chamber) 46. Since the outer diameter (d1) of the cylindrical member 130 (the outer diameter of the first circumferential wall 132) and an outer diameter (d2) of the cup member 240 (an outer diameter of the second circumferential wall 242) satisfy a relationship of d1>d2, the annular stepped surface 36 is formed in a boundary portion thereof.

The cylindrical filter 50 is the same as the cylindrical filter 50 shown in FIG. 1 with the exception of being slightly shorter. The cylindrical filter 50 is disposed to enclose the second communication holes 244 from outside such that the first end surface 51 is abutted against the annular stepped surface 36 and the second end surface 52 is abutted against the protrusion 243.

In the gas generator 1D shown in FIG. 5, due to dimensions of each relevant member being adjusted in advance, the second cylindrical space 47 is secured in a state of being communicated with the first cylindrical space 37 even after the cylindrical filter 50 is disposed. Thereby, pressure of a combustion gas is applied to the circumferential wall 53 of the cylindrical filter 50 in a vertical direction but the pressure is not applied to the first end surface 51 of the cylindrical filter 50 in the axial direction, so that buckling of the cylindrical filter 50 does not occur.

In addition, since the gas generator 1D shown in FIG. 5 enables a length of the cylindrical filter 50 to be shortened as compared to the gas generators 1 to 1C shown in FIGS. 1 to 4, a weight of the entire gas generator is reduced by the part.

(6) Gas Generator 1E Shown in FIG. 6

The gas generator 1E shown in FIG. 6 only differs from the gas generator 1B shown in FIG. 3 in shapes of a cup member and a cylindrical filter.

A cylindrical flow channel forming member 5E includes the cylindrical member 130 and a cup member 340. The cup member 340 has a circumferential wall whose outer diameter differs from that of a bottom surface 341. The circumferential wall includes a smaller-diameter circumferential wall 342 near the bottom surface 341 and a larger-diameter circumferential wall 343 on a side of an opening, and an outer diameter of the larger-diameter circumferential wall 343 is larger than an outer diameter of the smaller-diameter circumferential wall 342. The smaller-diameter circumferential wall 342 has a plurality of second communication holes 345. An annular surface 344 is formed in a radial direction due to a difference in outer diameters between the smaller-diameter circumferential wall 342 and the larger-diameter circumferential wall 343. The annular surface 344 may be a plane surface as illustrated or may be an inclined surface. The bottom surface 341 of the cup member 340 is abutted against the closed surface 131 of the cylindrical member 130, and an opening of the cup member 340 is abutted against the inner wall surface 11 of the cylindrical housing and the annular end surface 38.

A combination of the closed surface 131 of the cylindrical member 130 and the bottom surface 341 of the cup member 340 form a partition wall which separates the combustion chamber (the first chamber) 25 from the combustion gas inflow chamber (the second chamber) 46. Since the outer diameter (d1) of the cylindrical member 130 (the outer diameter of the first circumferential wall 132) and an outer diameter (d2) of the cup member 340 (an outer diameter of the smaller-diameter circumferential wall 342) satisfy a relationship of d1>d2, the annular stepped surface 36 is formed in a boundary portion thereof.

The cylindrical filter 50 is the same as the cylindrical filter 50 shown in FIG. 1 with the exception of being slightly shorter. The cylindrical filter 50 is disposed to enclose the second communication holes 345 from outside such that the first end surface 51 is abutted against the annular stepped surface 36 and the second end surface 52 is abutted against the annular surface 344. Thereby, the second cylindrical space 47 is secured between the cylindrical filter 50 and the inner wall surface 11 of the cylindrical housing opposing the cylindrical filter 50 radially outward, in a state where the second cylindrical space 47 faces the second communication holes 44 via the cylindrical filter 50.

In the gas generator 1E shown in FIG. 6, due to dimensions of each relevant member being adjusted in advance, the second cylindrical space 47 is secured in a state of being communicated with the first cylindrical space 37 even after the cylindrical filter 50 is disposed. Thereby, pressure of a combustion gas is applied to the circumferential wall 53 of the cylindrical filter 50 in a vertical direction but the pressure is not applied to the first end surface 51 of the cylindrical filter 50 in the axial direction, so that buckling of the cylindrical filter 50 does not occur.

In addition, since the gas generator 1E shown in FIG. 6 enables a length of the cylindrical filter 50 to be shortened as compared to the gas generators 1 to 1C shown in FIGS. 1 to 4, a weight of the entire gas generator is reduced by the part.

(7) Gas Generator 1F Shown in FIG. 7

In the gas generator 1F shown in FIG. 7, a shorter tubular member is used in place of the cup member of the gas generator 1B shown in FIG. 3 and shapes of a diffuser portion and a cylindrical filter are different.

A diffuser portion 120 has a bottom surface 120a, a circumferential wall 120b, a flange 120c formed at an opening and an annular wall 120d extended from the flange 120c in a same direction as the circumferential wall 120b. The diffuser portion 120 is welded and fixed in a state where the annular wall 120d is abutted against the inner wall surface on the side of the second end 10b of the cylindrical housing 10. An inner surface of the flange 120c forms an annular end surface 137.

A cylindrical flow channel forming member 5F includes the cylindrical member 130 and a shorter tubular member 440. The shorter tubular member 440 has a circumferential wall 441, a first end surface 442 on the side of the first end 10a of the cylindrical housing, and a second end surface 443 on the side of the second end 10b of the cylindrical housing. The circumferential wall 441 has a plurality of second communication holes 444. In the shorter tubular member 440, the first end surface 442 is abutted against the closed surface 131 of the cylindrical member 130 and the second end surface 443 is abutted against the annular end surface 137, so that the shorter tubular member 440 is fixed by being pressed from both sides in the axial direction.

The cylindrical filter 50 is the same as the cylindrical filter 50 shown in FIG. 1 with the exception of being slightly shorter. The cylindrical filter 50 is disposed to enclose the second communication holes 444 from outside such that the first end surface 51 is abutted against the annular stepped surface 36 and the second end surface 52 is abutted against the annular end surface 137.

In the gas generator 1F shown in FIG. 7, due to dimensions of each relevant member being adjusted in advance, the second cylindrical space 47 is secured in a state of being communicated with the first cylindrical space 37 even after the cylindrical filter 50 is disposed. Thereby, pressure of a combustion gas is applied to the circumferential wall 53 of the cylindrical filter 50 in a vertical direction but the pressure is not applied to the first end surface 51 of the cylindrical filter 50 in the axial direction, so that buckling of the cylindrical filter 50 does not occur.

In addition, since the gas generator 1F shown in FIG. 7 enables a length of the cylindrical filter 50 to be shortened as compared to the gas generators 1 to 1C shown in FIGS. 1 to 4, a weight of the entire gas generator is reduced by the part.

(8) Gas Generator 1G Shown in FIG. 8

The gas generator 1G shown in FIG. 8 uses a member, in which a cup-shaped diffuser portion is integrated with a shorter tubular member, in place of the cup member of the gas generator 1B shown in FIG. 3, and a shape of a cylindrical filter is different.

A cylindrical flow channel forming member 5G includes the cylindrical member 130 and a composite of a diffuser portion and a cup member (hereinafter, referred to as a "composite") 500. The composite 500 includes a cup-shaped diffuser portion 510, a tubular portion 520 and a connecting portion 530 of the cup-shaped diffuser portion 510 and the tubular portion 520.

The cup-shaped diffuser portion 510 has a bottom surface 511, a circumferential wall 512, and a flange 513, and the circumferential wall 512 has a plurality of gas discharge ports 515. The tubular portion 520 has a circumferential wall 521 having a plurality of second communication holes 522 and a first end surface 523 on the side of the cylindrical member 130. The circumferential wall 512 of the diffuser portion and the circumferential wall 521 of the tubular portion are adjusted to have same inner diameters and outer diameters. The connecting portion 530 connects the flange 513 of the diffuser portion with a second end surface on an opposite side in the axial direction to the first end surface 523 of the tubular portion 520. The connecting portion 530 has an annular wall 531 connected to the flange 513 of the diffuser portion and an annular inclined surface 532 connected to the second end surface of the tubular portion 520.

In the composite 500, the first end surface 523 on the side of the cylindrical member 130 is abutted against the closed surface 131 of the cylindrical member 130 and the annular wall 531 of the connecting portion 530 is abutted against the inner wall surface 11 on the side of the second end 10b of the cylindrical housing. The annular wall 531 and the inner wall surface 11 are welded at an abutting portion. Since the outer diameter (d1) of the cylindrical member 130 and an outer diameter (d2) of the circumferential wall 521 of the tubular portion satisfy a relationship of d1>d2, the annular stepped surface 36 is formed in a boundary portion thereof.

The cylindrical filter 50 is the same as the cylindrical filter 50 shown in FIG. 1 with the exception of being slightly shorter. The cylindrical filter 50 is disposed to enclose the second communication holes 522 from outside such that the first end surface 51 is abutted against the closed surface 131 of the cylindrical member 130 and the second end surface 52 is abutted against the annular inclined surface 532.

In the gas generator 1G shown in FIG. 8, due to dimensions of each relevant member being adjusted in advance, the second cylindrical space 47 is secured in a state of being communicated with the first cylindrical space 37 even after the cylindrical filter 50 is disposed. Thereby, pressure of a combustion gas is applied to the circumferential wall 53 of the cylindrical filter 50 in a vertical direction but the pressure is not applied to the first end surface 51 of the cylindrical filter 50 in the axial direction, so that buckling of the cylindrical filter 50 does not occur.

In addition, since the gas generator 1G shown in FIG. 8 enables a length of the cylindrical filter 50 to be shortened as compared to the gas generators 1 to 1C shown in FIGS. 1 to 4, a weight of the entire gas generator is reduced by the part.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a cylindrical housing;
an ignition device installed at a first end of the cylindrical housing, and a diffuser portion provided with a gas discharge port and installed at a second end on an opposite side to the first end;
a cylindrical flow channel forming member disposed inside the cylindrical housing such that a first end thereof faces the ignition device and a second end thereof on an opposite side to the first end faces the diffuser portion, the cylindrical flow channel forming member including a partition wall which separates a first chamber defined by a first circumferential wall on the side of the first end, from a second chamber defined by a second circumferential wall on the side of the second end;
a combustion chamber formed in the first chamber and charged with a gas generating agent which generates a combustion gas;
a discharge passage formed in the second chamber and allowing the combustion gas to flow to the diffuser portion;
a first cylindrical space formed between the first circumferential wall and an inner wall surface of the cylindrical housing, and a first communication hole formed in the first circumferential wall and communicating the combustion chamber with the first cylindrical space;
a second cylindrical space formed between the second circumferential wall and the inner wall surface of the cylindrical housing and being in communication with the first cylindrical space in an axial direction, and a second communication hole formed in the second circumferential wall and communicating the second cylindrical space with the discharge passage; and
a cylindrical filter disposed in the second cylindrical space and enclosing the second communication hole,
an outer diameter (d1) of the first circumferential wall and an outer diameter (d2) of the second circumferential wall satisfying a relationship of d1>d2 so that an annular stepped surface is formed between the first circumferential wall and the second circumferential wall, and the outer diameter (d1) of the first circumferential wall and an outer diameter (d3) of the cylindrical filter satisfying d1≥d3, and
between the cylindrical filter and the inner wall surface of the cylindrical housing, the second cylindrical space facing the second communication hole via the cylindrical filter.

2. A gas generator, comprising:
an ignition device installed on the side of a first end of a cylindrical housing, and a diffuser portion provided with a gas discharge port and installed on the side of a second end on an opposite side in an axial direction to the first end;

an annular end surface at the second end, which is in contact with an inner wall surface of the cylindrical housing, being formed between the second end of the cylindrical housing and the diffuser portion;

a cylindrical flow channel forming member disposed from the side of the first end toward the second end inside the cylindrical housing, an internal space of the cylindrical flow channel forming member being partitioned by a partition wall into a first chamber on the side of the first end and a second chamber on the side of the second end;

a space, which includes the first chamber inside the cylindrical flow channel forming member, being a combustion chamber charged with a gas generating agent and the second chamber inside the cylindrical flow channel forming member forming part of a gas discharge passage which allows a combustion gas generated by combustion of the gas generating agent to flow toward the diffuser portion;

the cylindrical flow channel forming member having a first circumferential wall facing the first chamber and a second circumferential wall facing the second chamber;

in the cylindrical flow channel forming member, an upstream end of the flow channel forming member on an upstream side of a flow of the combustion gas toward the gas discharge port during actuation being positioned on the side of the first end of the cylindrical housing, a downstream end of the flow channel forming member on a downstream side of the flow of the combustion gas being positioned on the side of the second end of the cylindrical housing, and the downstream end being abutted against the annular end surface;

a first cylindrical space being formed between the first circumferential wall and the inner wall surface of the cylindrical housing, a second cylindrical space being formed between the second circumferential wall and the inner wall surface of the cylindrical housing, and the first cylindrical space and the second cylindrical space being arranged so as to form a continuous space in the axial direction;

a plurality of first communication holes being formed in the first circumferential wall and a plurality of second communication holes being formed in the second circumferential wall;

a cylindrical filter which encloses the second communication holes being disposed in the second cylindrical space;

an outer diameter (d1) of the first circumferential wall on the side of the first chamber and an outer diameter (d2) of the second circumferential wall on the side of the second chamber satisfying a relationship of d1>d2, an annular stepped surface being formed between the first circumferential wall and the second circumferential wall;

a portion being provided in which the outer diameter (d1) of the first circumferential wall and an outer diameter (d3) of the cylindrical filter satisfy a relationship of d1≥d3; and between the cylindrical filter and the inner wall surface of the cylindrical housing opposing the cylindrical filter radially outward, the second cylindrical space which is continuous with the first cylindrical space being secured in a state where the second cylindrical space faces the second communication holes via the cylindrical filter.

3. The gas generator according to claim 1, wherein the cylindrical filter has uniform inner and outer diameters.

4. The gas generator according to claim 1, wherein the cylindrical filter has a uniform inner diameter, and the second end surface of the cylindrical filter on the side of the second end of the cylindrical housing has a largest outer diameter, the outer diameter (d1) of the first circumferential wall, an outer diameter (d4) of the first end surface of the cylindrical filter on the side of the first end of the cylindrical housing, and an outer diameter (d5) of the second end surface of the cylindrical filter satisfy a relationship of d5>d1≥d4.

5. The gas generator according to claim 1, wherein the cylindrical filter has a first end surface on the side of the first end of the cylindrical housing, a second end surface on the opposite side in the axial direction to the first end surface and a flange at the second end surface, and an inner diameter from the first end surface to the second end surface is uniform, the outer diameter (d1) of the first circumferential wall, an outer diameter (d6) of the cylindrical filter on a side of the first end surface, and an outer diameter (d7) of the flange on a side of the second end surface satisfy a relationship of d7>d1≥d6.

6. The gas generator according to claim 1, wherein the second circumferential wall of the cylindrical flow channel forming member has a protrusion, which protrudes radially outward, on an outer circumferential surface, and the cylindrical filter is disposed to enclose the second communication hole between the protrusion and the annular stepped surface.

7. The gas generator according to claim 1, wherein the second circumferential wall of the second chamber of the cylindrical flow channel forming member has an enlarged diameter portion which expands radially outward, and the cylindrical filter is disposed to enclose the second communication hole between the enlarged diameter portion and the annular stepped surface.

8. The gas generator according to claim 2, wherein the cylindrical filter has uniform inner and outer diameters.

9. The gas generator according to claim 2, wherein the cylindrical filter has a uniform inner diameter, and the second end surface of the cylindrical filter on the side of the second end of the cylindrical housing has a largest outer diameter, the outer diameter (d1) of the first circumferential wall, an outer diameter (d4) of the first end surface of the cylindrical filter on the side of the first end of the cylindrical housing, and an outer diameter (d5) of the second end surface of the cylindrical filter satisfy a relationship of d5>d1≥d4.

10. The gas generator according to claim 2, wherein the cylindrical filter has a first end surface on the side of the first end of the cylindrical housing, a second end surface on the opposite side in the axial direction to the first end surface and a flange at the second end surface, and an inner diameter from the first end surface to the second end surface is uniform, the outer diameter (d1) of the first circumferential wall, an outer diameter (d6) of the cylindrical filter on a side of the first end surface, and an outer diameter (d7) of the flange on a side of the second end surface satisfy a relationship of d7>d1≥d6.

11. The gas generator according to claim 2, wherein the second circumferential wall of the cylindrical flow channel forming member has a protrusion, which protrudes radially outward, on an outer circumferential surface, and
  the cylindrical filter is disposed to enclose the second communication hole between the protrusion and the annular stepped surface.

12. The gas generator according to claim 2, wherein the second circumferential wall of the second chamber of the cylindrical flow channel forming member has an enlarged diameter portion which expands radially outward, and
  the cylindrical filter is disposed to enclose the second communication hole between the enlarged diameter portion and the annular stepped surface.

* * * * *